United States Patent Office 2,765,203
Patented Oct. 2, 1956

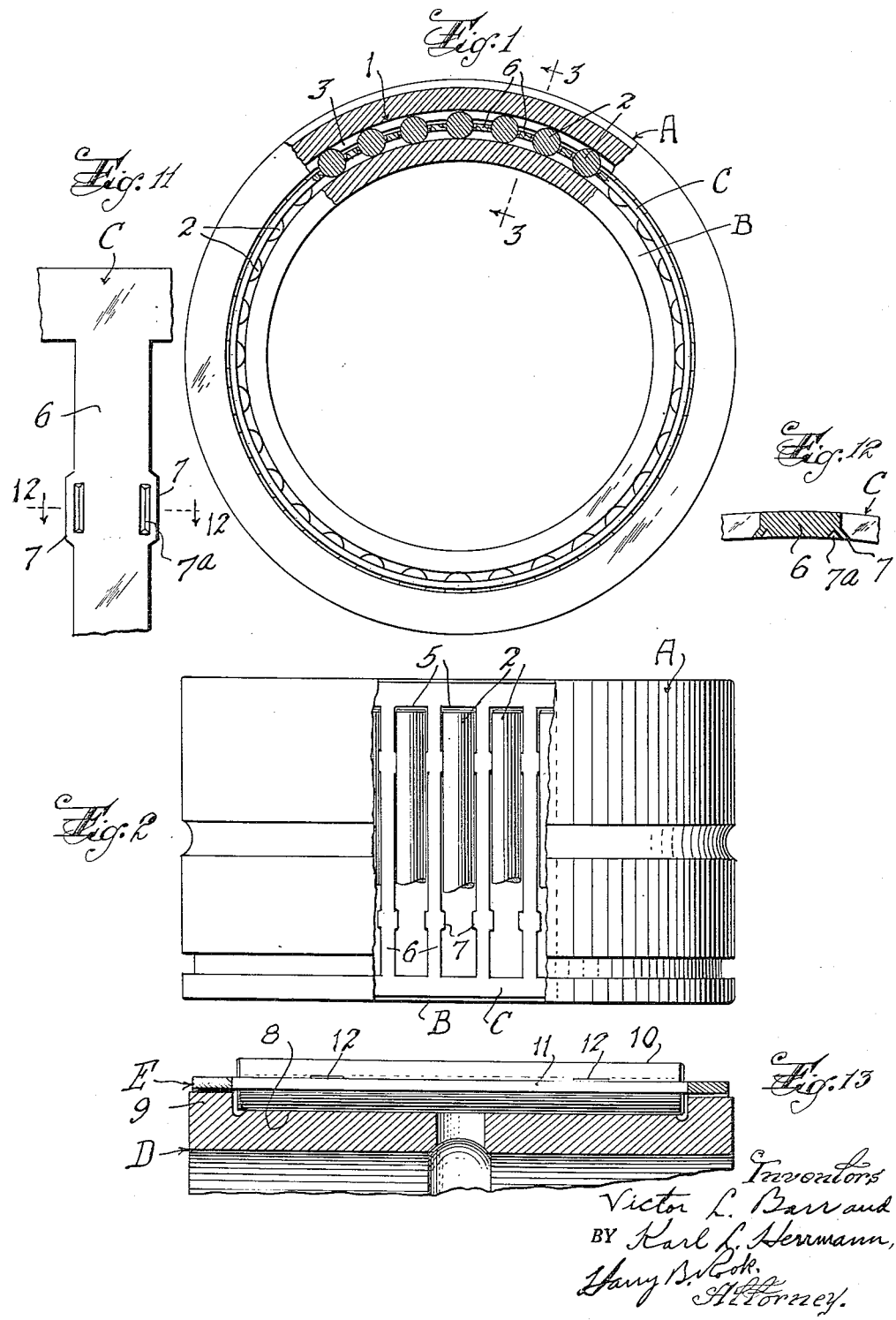

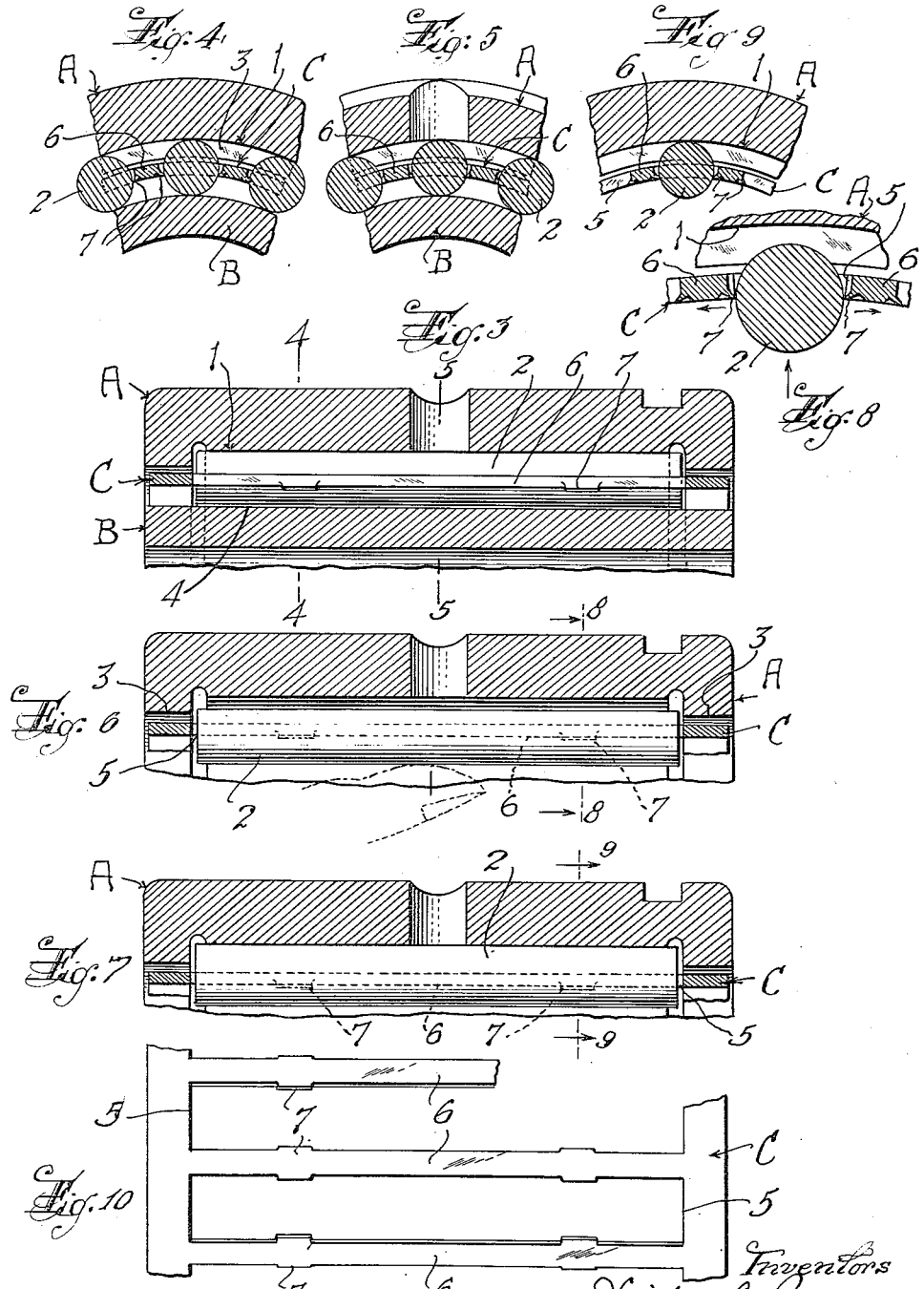

2,765,203

ROLLER BEARING

Victor L. Barr, Philadelphia, Pa., and Karl L. Herrmann, Glendale, Calif., assignors to Roller Bearing Company of America, Trenton, N. J., a corporation of New Jersey Application September 15, 1950, Serial No. 185,022

2 Claims. (Cl. 308—212)

This invention relates to a cage type roller bearing including a hollow cylindrical cage for rollers having a plurality of parallel slots extending therethrough and longitudinally thereof, and a roller in each of said slots the diameter of which is greater than the thickness of the cage so that the peripheries of the rollers extend beyond the exterior and interior surfaces of the cage. More particularly, the invention contemplates roller bearings wherein the rollers are of small diameter, for example, of the needle type, and the wall of the cage is of thin cross-section. The cage is disposed between two race rings or between a race ring and a shaft or journal or other bearing element with the diametrically opposite portions of the peripheries of the rollers engaging respectively the raceways in said race rings or in the race ring and the shaft, journal or other bearing element.

Many roller bearings of this general nature include a race ring having flanges at its ends, and the assembly of a cage and rollers in such a bearing has always constituted a perplexing problem, one solution of which has been to make one of the end or roller-retaining flanges of the race ring separable from the ring so that the cage and rollers assembled therein can be slipped endwise into the raceway and thereafter the separable end flange can be secured in position. This is far from satisfactory and it has always been desirable to make such a bearing with integral flanges on the race ring. In the co-pending application of Victor L. Barr, Karl L. Herrmann and Gerald A. Henwood, Serial No. 140,436, is described and claimed one method of assembling the rollers and the cage in the channel-shaped raceway of a roller bearing race ring having integral roller-retaining end flanges, said method consisting in forming the cage of resilient material, temporarily springing the resilient roller-guiding bars in radial planes of the cage and slipping rollers endwise between the roller guiding bars between the slots in the cage into rolling contact with the raceway while said bars are sprung.

An object of the present invention is to provide another novel and improved method of assembling the rollers and cage in the channel-shaped raceway of a roller bearing wherein the portions of the cage between the roller receiving slots are sprung or temporarily elastically deformed laterally of themselves in their own planes, or circumferentially of the cage and allow the rollers to be inserted into said slots by movement of the rollers radially of the cage between said roller-guiding bars.

A further object is to provide a roller bearing of the character described which shall have a roller cage of novel and improved construction whereby the cage can be positioned within the race ring and thereafter the rollers can be inserted into the slots in the cage and into the raceway by simple bodily movement of the rollers radially of the cage and between the roller guiding bars and simple momentary elastic deformation or springing of the roller guiding bars laterally of themselves or circumferentially of the cage.

Other objects, advantages and results of the invention will be brought out by the following description in conjunction with the accompanying drawings in which Figure 1 is an elevational view of a bearing embodying the invention, partially broken away and shown in section;

Figure 2 is a side elevational view of the bearing with a portion of the outer race ring broken away for clearness in illustration;

Figure 3 is an enlarged fragmentary central vertical longitudinal sectional view approximately on the plane of the line 3—3 of Figure 1;

Figure 4 is an enlarged fragmentary transverse vertical sectional view approximately on the plane of the line 4—4 of Figure 3;

Figure 5 is a similar view approximately on the plane of the line 5—5 of Figure 3;

Figures 6 and 7 are views similar to Figure 3 but with the inner race ring removed and showing progressive steps in the assembly of the cage and rollers within the race ring;

Figure 8 is a view similar to Figure 5 approximately on the plane of the line 8—8 of Figure 6;

Figure 9 is a fragmentary transverse vertical sectional view on the plane of the line 9—9 of Figure 7;

Figure 10 is a fragmentary side elevational view of the cage showing the roller-guiding bars in detail;

Figure 11 is a further enlarged fragmentary elevational view of a portion of the cage ring showing in detail the roller retaining lips in the roller-guiding bars;

Figure 12 is a transverse vertical sectional view approximately on the plane of the line 12—12 of Figure 11; and Figure 13 is a fragmentary central vertical longitudinal sectional view through another form of roller bearing embodying the invention and having the rollers mounted on the exterior of the race ring instead of on the interior of the race ring as shown in Figure 3.

Specifically describing the embodiment of the invention illustrated in Figures 1 to 12, inclusive, the reference character A designates the outer race ring of a roller bearing which has a channel-shaped raceway 1 for rollers 2 at opposite ends of which are end roller-retaining flanges 3 that are integral with the ring. Cooperating with the outer race ring A is an inner race ring B which may be mounted on a shaft or other suitable support and has an exterior raceway 4.

Disposed between the race rings A and B is a roller retainer or cage C which has a plurality of circumferentially spaced slots 5 extending therethrough and longitudinally thereof in each of which is located one of the rollers 2. In accordance with the invention, the cage is tubular and cylindrical and formed of inherently resilient material which has approximately the same coefficient of expansion as the race ring and rollers. Preferably the race rings are formed of steel and the cage is a thin walled tube of steel the outer diameter of which is slightly less than the internal diameter of the roller retaining flanges 3 of the race ring so that the tube may be inserted into said flanges with a slight clearance to permit free rotation of the cage within the flanges, and thus said flanges will guide and reinforce the cage against deformation and prevent wobbling thereof.

The thickness of the walls of the cage is substantially less than the diameter of the rollers and the side walls of the slots 5 are formed by roller-guiding bars 6. The length and width of the slots 5 correspond respectively substantially to the length and diameter of the rollers 2 so that the side walls of the slots slidably engage the peripheries of the rollers and the free ends of the rollers to abut the roller-retaining flanges 3; and the diameter of the cage is such that the bars 6 engage the rollers on the pitch circle that passes through the axes of all of the rollers when the cage and rollers are assembled in said race ring, whereby the rollers will be accurately guided by said roller guiding bars at said pitch circle so as to prevent individual and mass skewing of the rollers and reduce the effects of shaft misalignment.

The roller guiding bars 6 are inherently resilient and yieldable laterally of themselves approximately in their own planes or circumferentially of the cage, and projecting into each slot 5 from each of opposite sides thereof are one or more protrusions, projections, lips or lugs 7, said projections at opposite sides of each slot being spaced apart transversely of the slot a distance less than the diameter of the rollers. These projections or lips may be formed in any suitable way, but for the purpose of illustration are produced by a staking method, the roller guiding bars being prick-punched or staked as indicated at 7a to displace the metal of the bars laterally into the slots so as to form the lips 7. The lips are so related to the edges of the roller retaining bars that when the cage is inserted in the race way with the rollers in contact therewith, said lips will engage the rollers at the sides of their axes opposite the race way as shown for example in Figures 1, 3 and 4, and hold the rollers against separation from the race ring.

In assemblying the cage and rollers in a race ring, the cage with the rollers is first inserted into the race ring and then the rollers are inserted individually as shown in Figures 6, 7 and 8, each roller being pressed bodily and radially of the cage against the roller retaining bars from the side of the cage opposite the race way, as shown in Figures 6 and 8, the pressure being continued so as to spring the roller retaining bars laterally apart to permit the roller to slip past the lips 7, whereupon the spring action of the roller guiding bars 6 will snap the rollers into contact with the race way 1 and between the end flanges 3 as shown in Figures 3, 4 and 7. The lips 7 will thereafter hold the rollers in that position and against separation from the race ring. The inner race ring B or a shaft or other bearing element may then be inserted into the cage.

As shown in Figures 6 to 8, inclusive, the rollers are pushed radially outwardly from the axis of the bearing into the inner race way 1; but where the cake and roller are associated with an outer race way 8 on an inner race ring D, as shown in Figure 13, the cage E is disposed exteriorly of the race way and in relatively rotatable slidable relation to the roller retaining flanges 9, and the rollers 10 are pushed radially inwardly into the roller-receiving slots between the roller guiding bars 11 which arae sprung apart as the rollers are pressed between them and thereafter snap the rollers into contact with the race way. In this form of bearing, the lips 12 which may be the same as the lips 7, engage the peripheries of the rollers at the sides of the axes thereof opposite the race way 8 so as to hold the rollers against separation from the race ring.

With this construction, it will be observed that the rollers will be accurately guided at their ends on the pitch circle and will be retained in the cage by the lips intermediate of the length of the roller and inwardly of the pitch circle. Also, the cage will be guided on the relatively wide inner edge surfaces of the end flanges 3 and the end thrust of the rollers will be assumed directly by said end flanges instead of by the cage as in some other roller bearings. The construction also provides adequate openings at the ends of the bearing for lubrication, the spaces between the inner and outer race rings or between the race ring and the shaft, as the case may be, providing for easy flow of lubricant to and around the rollers. The most important feature of the invention is the elastic lateral deformation or springing of the roller-guiding bars of the cage to permit insertion of the rollers and thereby make possible the use of a race ring having integral end flanges.

The projections or lips 7 may be varied in number and location, but preferably there are two lips on each side of each roller-guiding bar, each lip being disposed between the central median plane of the race ring and the end of the roller slot 5. It is desirable that the lips be in substantial spaced relation to the ends of the slots so as to allow adequate lateral springing of the roller guiding bars when the rollers are inserted into the roller slots. Moreover, the form of the lips may be widely varied and they may or may not have resiliency in themselves in addition to the lateral resiliency of the roller guiding bars, in order to facilitate the insertion of the rollers.

A roller bearing constructed in accordance with the invention, and particularly a needle bearing having rollers of small diameter and of a length many times greater than the diameter, will successfully operate for long periods of time under heavy loads and at high speeds. Moreover, the bearing produces minimal friction which is considerably less than the friction found in true full complement needle bearings; and this low friction makes possible lower power consumption, less lubrication, less tendency of the race ring to rotate in the bearing housing, lower temperatures in the bearing and consequently less expense of the bearing parts. Furthermore, the cage and race ring having substantially the same coefficient of expansion, the clearance between the cage ring and the roller retaining flanges 3 may be maintained substantially uniform and close so as to, at the same time, provide firm support of the cage against deformation and wobbling and prevent excessive friction. Moreover, the cage ring and its relation to the rollers and race ring makes possible greater uninterrupted roller length, and consequently greater load capacity, within given over-all dimensions.

We claim:

1. A cylindrical roller bearing comprising a race ring having integral flanges with a raceway between them, said flanges having annular faces, a thin-walled tubular cage of substantially uniform radial thickness and comprising inherently resilient material forming axially extending, unbroken rims which are guided and reinforced against deformation by said surfaces of said flanges, said cage having laterally resilient bars connecting said rims and forming therewith roller windows between said flanges, each bar being normally straight between said rims, and a series of cylindrical rollers disposed in said windows and in said raceway and each having a length at least several times its diameter, each roller being positioned in a window which has a circumferential width for at least a major portion of its length greater than the diameter of the roller therein, said bars engaging said rollers on the pitch circle that passes through the axes of all said rollers, each of said resilient bars having roller retainers projecting into windows on opposite sides thereof, the retainers on each bar all being adjacent the circumferential face of the cage which faces away from the raceway, the retainers which project from a bar into an adjoining window being spaced from said rims and from one another along the same side of said bar, and said rollers being movable into and out of said windows between said retainers by springing said bars laterally away from one another.

2. A cylindrical needle roller bearing comprising a race ring having integral side ribs with a raceway between them, a tubular guiding cage having flangeless, unbroken annular rims overlying and guided by said ribs, said cage consisting of inherently resilient material and having laterally resilient but normally straight bars connecting said rims and forming therewith roller windows between said rims, and a series of cylindrical rollers disposed in said windows and in said raceway and each having a length several times its diameter, each roller being positioned in a window which has for at least a major portion of its length a circumferential width greater than the diameter of the roller, said bars engaging said rollers on the pitch circle that passes through the axes of all of the rollers, each of said bars having lips projecting therefrom into windows on opposite sides thereof, the lips on each bar all being adjacent the circumferential face of the cage which faces away from the raceway, each lip lying entirely between the transverse central median plane of the race ring and a rim aforesaid, the lips on each bar being widely spaced from one another axially of the bearing, said bars and rims lying in the same outer and inner circumferential surfaces, and said bars being bodily movable away from one another laterally to permit the passage of said rollers between said lips.

References Cited in the file of this patent

UNITED STATES PATENTS

| | | |
|---|---|---|
| 1,173,719 | Hirth | Feb. 29, 1916 |
| 1,231,752 | Laycock | July 3, 1917 |
| 1,395,244 | Andre | Nov. 1, 1921 |
| 1,443,340 | Blomberg | Jan. 30, 1923 |
| 1,598,025 | Stevens | Aug. 31, 1926 |
| 1,764,198 | Carlson | June 17, 1930 |
| 1,765,648 | Bott | June 24, 1930 |
| 1,963,407 | Herrmann | June 19, 1934 |
| 2,044,168 | Heim | June 16, 1936 |
| 2,044,663 | Brodin | June 16, 1936 |
| 2,227,064 | Bryant | Dec. 31, 1940 |
| 2,327,237 | Baden | Aug. 17, 1943 |
| 2,409,236 | Banker | Oct. 15, 1946 |
| 2,417,559 | Larson | Mar. 18, 1947 |
| 2,503,070 | Reiss | Apr. 4, 1950 |

FOREIGN PATENTS

| | | |
|---|---|---|
| 429,234 | Great Britain | May 27, 1935 |